July 22, 1930.  J. J. McCONNELL  1,771,054
LIFTING APPARATUS
Filed June 17, 1925  4 Sheets-Sheet 1
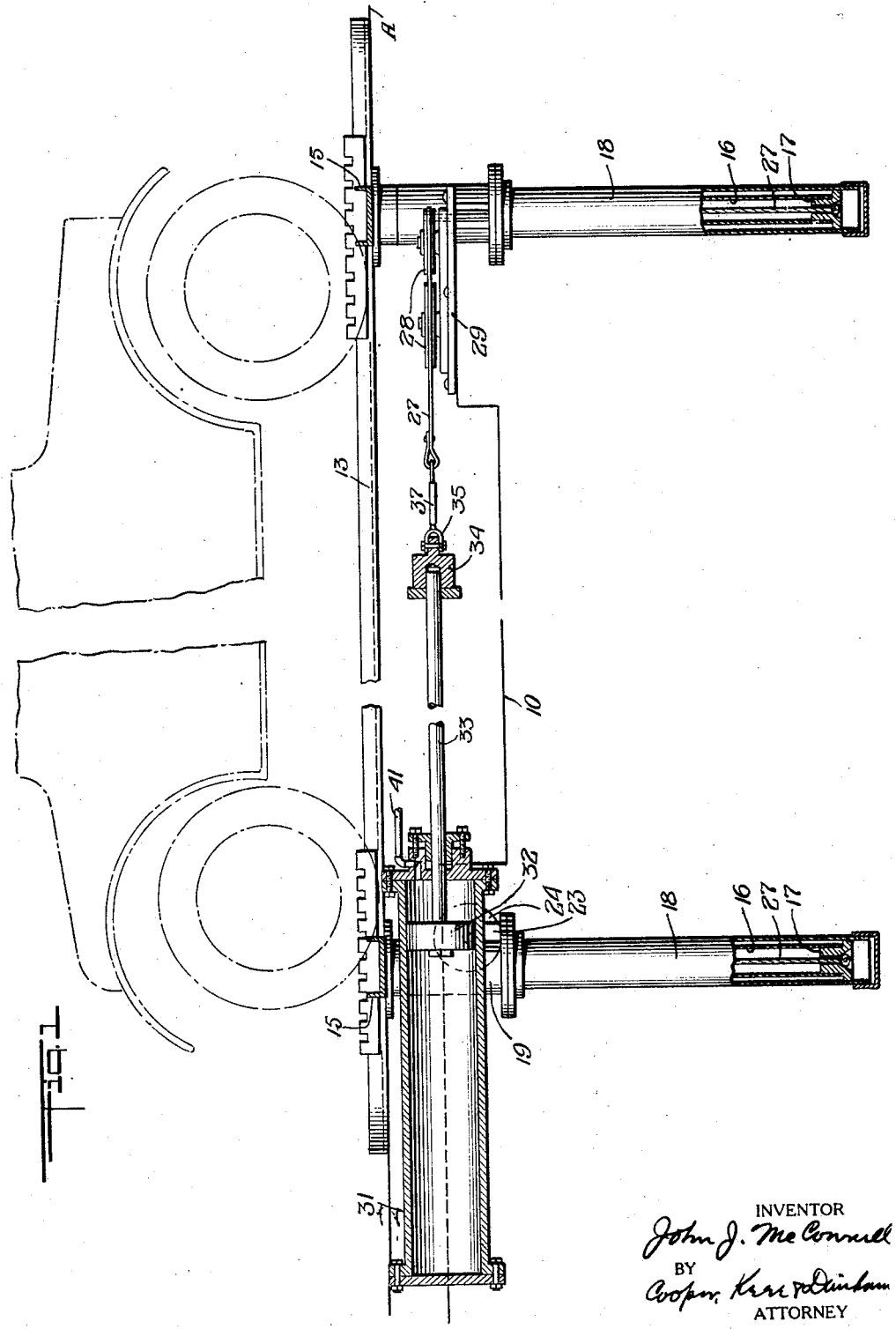
INVENTOR
John J. McConnell
BY
Cooper, Kerr & Dunham
ATTORNEY July 22, 1930.  J. J. McCONNELL  1,771,054
LIFTING APPARATUS
Filed June 17, 1925   4 Sheets-Sheet 2
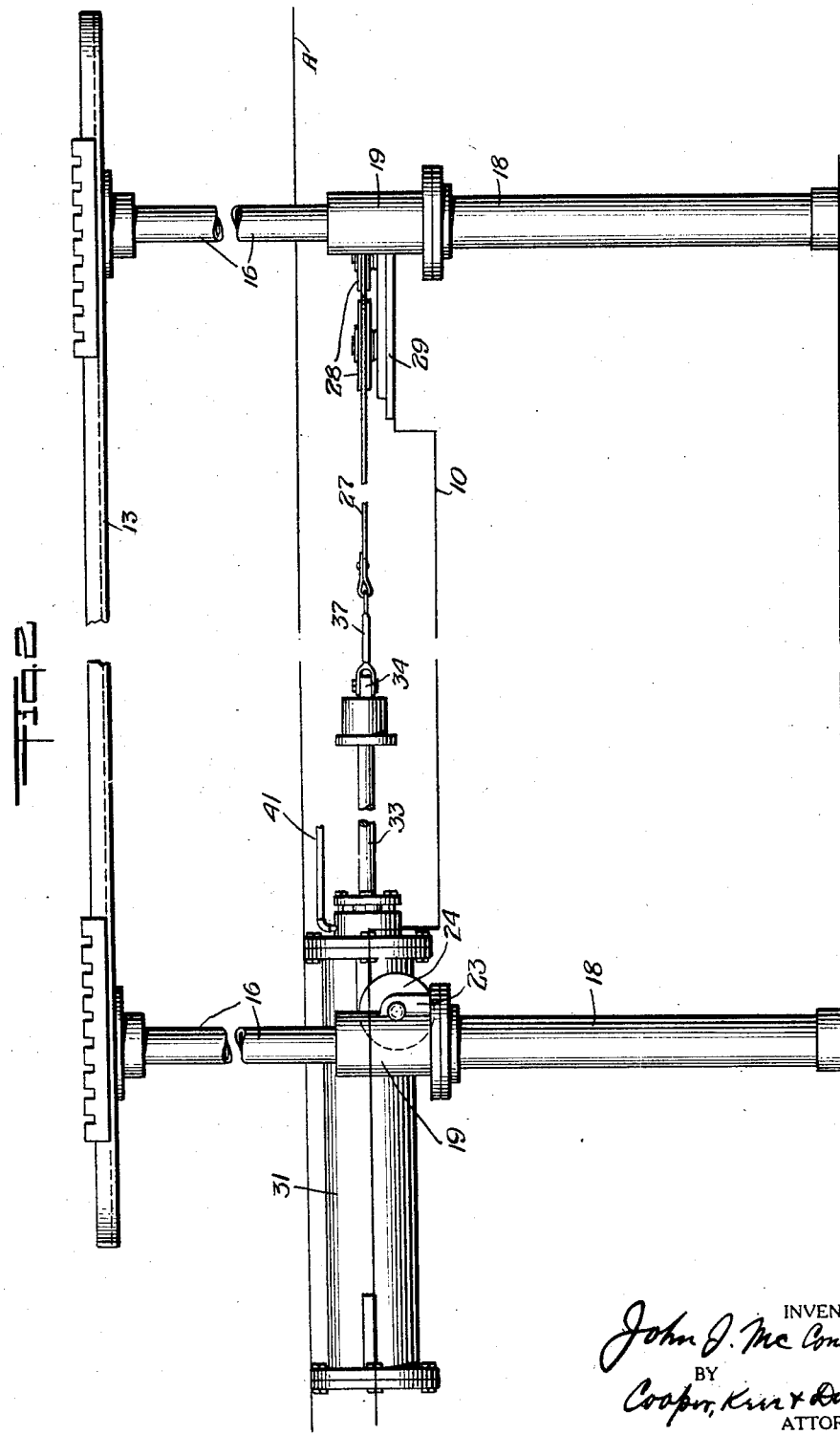
INVENTOR
John J. McConnell
BY
Cooper, Kerr & Dunham
ATTORNEY

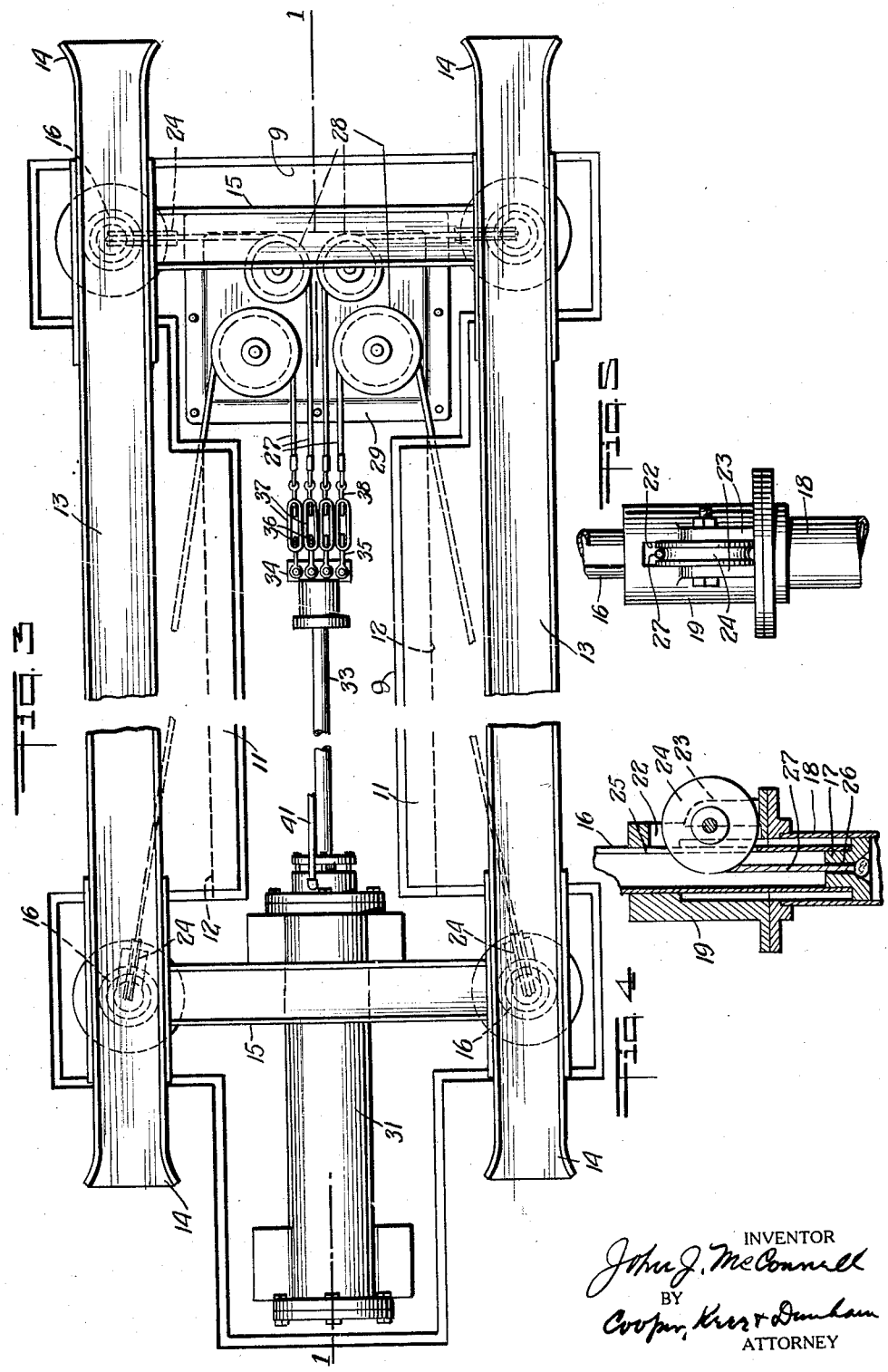

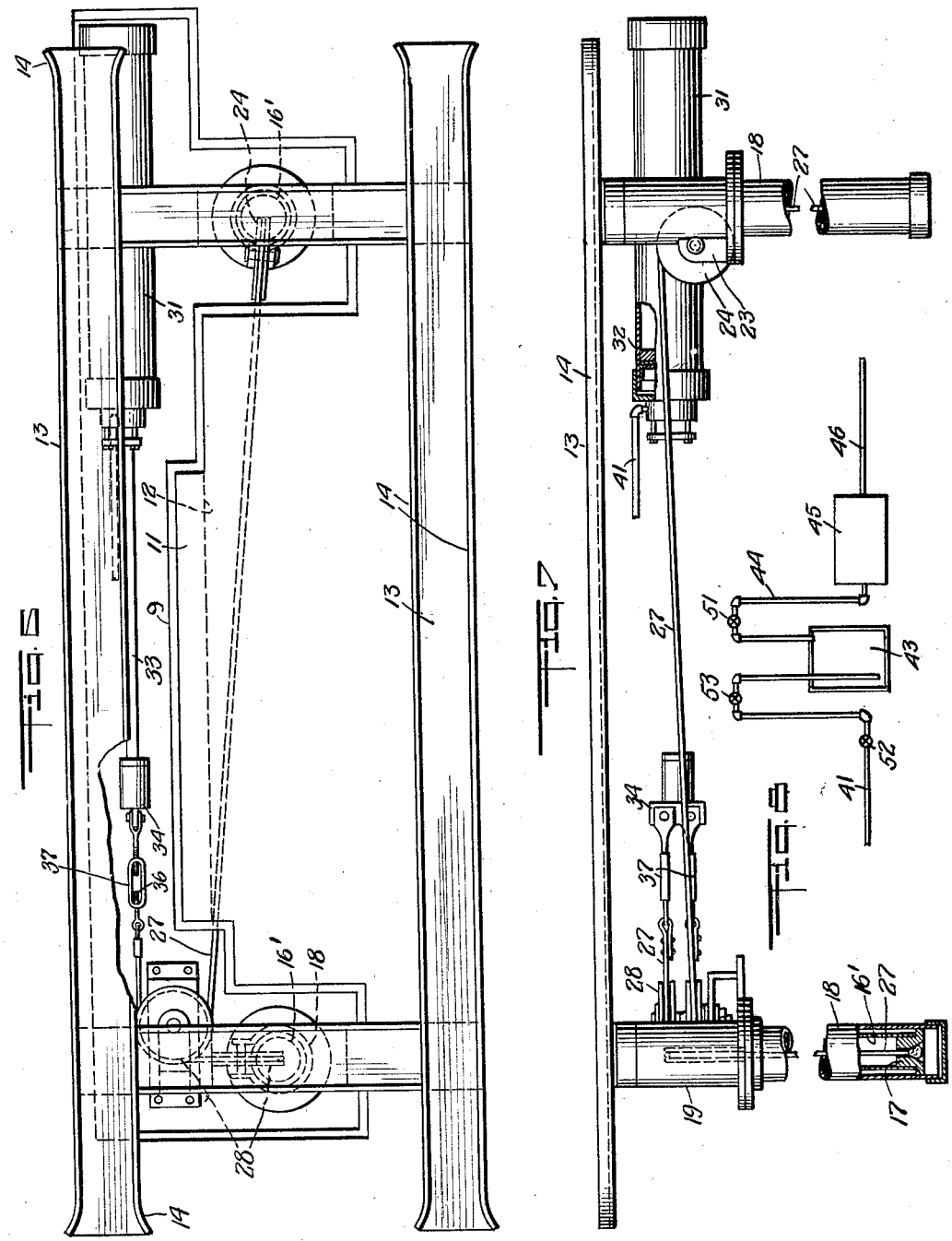

Patented July 22, 1930

1,771,054

UNITED STATES PATENT OFFICE

JOHN JAMES McCONNELL, OF SHREVEPORT, LOUISIANA, ASSIGNOR TO LOUISIANA OIL REFINING CORPORATION, OF RICHMOND, VIRGINIA, A CORPORATION OF VIRGINIA

LIFTING APPARATUS

Application filed June 17, 1925. Serial No. 37,643.

One object of the invention is to provide a simple, sturdy and highly efficient apparatus for raising automobiles and other vehicles from floor level to a height sufficient to give convenient access to the lower parts of the vehicle. The device is particularly suitable for use in garages, service stations and similar places, but as will be clear later on, the novel structure is suitable for use or may readily be adapted for use in various places and for a number of different purposes.

Another object is to provide an apparatus of the kind mentioned which will support a load in horizontal position at any height regardless of whether the load is accurately distributed on the load support. This feature is important in quick operation because of the saving of time in placing various loads, particularly automobiles and trucks of widely varying lengths of wheel bases, and because of the fact that it minimizes danger of accidents caused by the load running or slipping off if the load support becomes slightly inclined after the lifting operation is started.

Another object is to provide a construction whereby the load support will not interfere with or be in the way of a workman in changing oil, greasing or making repairs to the underside of the automobile or other vehicle, in connection with a general organization which will permit installation of an apparatus and still leave a floor space which is for all practical purposes substantially uninterrupted. This general organization comprises the idea of locating all of the mechanism immediately associated with the load supporting and lifting parts below the floor level in a pit which is preferably so constructed that the load support is properly supported while the load is being placed and which is so constructed that the workman will have plenty of floor space to work upon even though the comparatively small mouth of the pit is not covered by movable flooring which may be provided when installing the apparatus.

With the above and incidental objects in view, the invention comprises a novel combination and relation of parts, the essential elements of which are pointed out in appended claims, and a preferred embodiment of which is hereinafter described in detail with reference to the drawings accompanying and forming a part of this specification.

In said drawings:

Fig. 1 is a section (partly broken away) on the line 1—1 of Fig. 3.

Fig. 2 is a side view (partly broken away) of the apparatus with the load support in partially lifted position.

Fig. 3 is a top plan view (partly broken away) of the preferred construction.

Fig. 4 is a detail in section of one of the guides for the lifting plunger with the plunger elevated.

Fig. 5 is a detail which, in connection with Fig. 4, shows one of the horizontal sheaves or pulleys and the way it is supported.

Figs. 6 and 7 are respectively top plan and side views of a modified form of the lifting apparatus.

Fig. 8 is a diagrammatic showing of part of the mechanism for controlling the raising and lowering of a load.

The novel apparatus comprises a plurality of vertically movable plungers and guide columns or posts therefor which will be described in detail later on. In installing one of the apparatuses, the guide posts are firmly supported, preferably by embedding them in concrete. Between the guide posts the concrete may be given the form shown at 9 in Fig. 3 to provide a comparatively shallow pit in which much of the mechanism is mounted or supported. In constructing the pit its walls are preferably so constructed as to form a support for the load platform when the automobile or other load is being placed in position and also to leave available as much of the floor space as possible. While, as stated, the pit is comparatively shallow, the bottom being indicated by the line 10 in Fig. 2, and its walls so constructed that the opening is not very wide, a suitable removable flooring may be supplied for covering substantially all of the pit. The portions 11 of the pit structure are hollow or formed to provide conduits 12 for cables or corresponding connections described more in detail later on.

The apparatus shown in the drawings is intended for use in lifting automobiles and trucks and comprises a pair of parallel rails or tracks 13 provided with upturned flanges 14 forming channels to receive the wheels of the vehicle. The flanges may, if desired, be flared outward at the ends of the tracks to assist in guiding the vehicle into the channels. Connecting the rails 13 is a pair of bars or channel irons 15, thereby, in connection with the rails, forming a rectangular load support frame which is open to such an extent as not to interfere with the workmen when the load has been lifted.

In normal or load receiving position, the tracks 13 are at floor level and preferably rest at their ends and at intermediate portions upon the floor space provided in constructing the pit 9, thereby affording a firm support while the load is being placed in position. This position of the tracks is shown in Fig. 1, the floor level being represented by the line A.

In the preferred construction, a pair of vertically movable plungers 16 is attached to the underside of each rail 13. Each of these plungers 16 is hollow (see Fig. 1) and is provided at its bottom with a suitable guide bushing 17 which, in addition to other functions, cooperates with the interior of a column guide 18 to guide the plunger. Attached to the upper end of each guide column is an element 19 (Figs. 2, 4 and 5) suitably constructed to serve as a guide for the upper portion of the plunger. The guide posts or columns 18 are (as before stated) preferably embedded in or surrounded by the concrete used in constructing the pit 10, but any desired means for rigidly supporting them in vertical position may be employed.

Each of the elements 19 is slotted as at 22, and at each side of the slot is a flange 23 supporting and guiding a sheave 24 mounted for rotation in a vertical plane. Each of the sheaves 24 has a portion of its periphery extending through a long slot 25 in the associated plunger 16.

Each of the guide bushings 17 previously mentioned has a central opening 26 through which passes one end of a cable 27, preferably of the soft lay type, the lower end of the cable being knotted, headed or provided with any desired means for making a strong connection between the cable and the bushing. The cable 27 extends up over the sheave 24 and then over one of the sheaves or pulleys 28 (Fig. 3). The pulleys 28 are all supported for rotation in horizontal planes by a bed plate 29 secured in any suitable way to the bottom 10 of the pit. Also secured to the bottom of the pit is a cylinder 31 provided with a piston 32, the rod 33 of which carries at its outer end a cross head 34. Secured to the cross head are clevises 35 having threaded portions 36 engaging turnbuckles 37, the other end of each turnbuckle cooperating with the threaded end of an eye bolt 38. Attached to each of the eye bolts 38 is an end of one of the cables 27. In installing the apparatus care is taken to have all of the cables of the proper length to give substantially uniform movements to all of the plungers 16 when the cross head 34 moves, and the turnbuckle mechanism may then be used to effect accurate adjustments so that all of the plungers will move in unison and equal distances. The construction just described insures a horizontal position of the rails 13 at any of the positions to which they may be raised.

The piston 32 may be operated by water or by compressed air by suitable connections 41 to a water supply or air compressor. Either or both are usually available in most places where an installation is likely to be made. Where neither is available the apparatus may be modified by using some other form of prime mover, such as a winch and suitable connections for operating the cross head 34 or equivalent member common to the plungers.

In Fig. 8 there is shown in somewhat diagrammatic form an apparatus for effecting and controlling the movements of the piston which has some of the advantages of both hydraulic and compressed air operation and is particularly adapted for installations where satisfactory water pressure is not available. This apparatus comprises an air-tight tank 43 containing water or any other suitable liquid. Entering the top of the tank 43 is a pipe 44 leading to a compressed air storage tank 45 which is in turn connected by a pipe 46 to an air compressor (not shown). The pipe connection 41 (Figs. 1 and 2) previously mentioned, is made to extend down to a point near the bottom of the tank 43. The pipe 44 is provided with a three-way air cock 51 and the pipe 41 with a check valve 52 drilled for retardation of flow of liquid and an ordinary stop cock 53. This apparatus may be so located at any point that convenient access may be had to the valves. When it is desired to lift a load the valves are all set so that air from the air storage tank or the compressor will force liquid from the tank 43 to the cylinder 31, thereby driving the piston 32 to the left (Fig. 1) and acting through the cables and other connections described to raise all of the plungers 16 vertically. After the load has been lifted to the desired height the stop cock 53 is closed and the three-way valve 51 set to shut off the air supply. After the work on the load is completed it may be lowered by opening the stop cock 53 and setting the three-way valve 51 to release the air pressure. As the load descends and the piston 32 moves to the right (Fig. 1) the liquid will be forced by the piston back into the tank 43, the air in the tank above the liquid serving as a cushion and the rapidity of the downward movement being controlled by means of the three-way valve 51. It is apparent, of course, that the usual air hose used for inflating tires may be connected either to the pipe 44 or to the pipe 46 in any suitable manner if, for any reason, that arrangement is more satisfactory than having the pipe 46 connected directly to the compressor. In making such a modified connection, however, the three-way valve 51 should be retained.

In Figs. 6 and 7 there is shown a modification which is somewhat simpler than the corresponding preferred construction previously described. The principal difference is that the modification employs only two vertically movable plungers 161, with a corresponding simplification of the cable and sheave construction. In order to prevent side sway the plungers 161 should be of larger diameter than the plungers 16 in the preferred construction, but this is not a serious objection. One advantage of the modified structure is that it makes possible a more compact arrangement with a corresponding reduction in the size of the pit. The organization generally of the modification resembles in most of its details the preferred form and substantially the same reference numerals are used for both forms. The apparatus for effecting and controlling the movements of the operating piston of the modified construction may be the same as previously described.

From the foregoing it will be seen that the the invention provides a jack or lifting device which is much more satisfactory than racks of the drive up type or the usual dangerous and inconvenient open pits which must be of considerable depth if they are of any great value.

The construction has been described in considerable detail, but it is not the desire to be limited to such details, except as they are included in the claims which follow.

What is claimed is:

1. In an apparatus of the character described, the combination of an open load supporting frame having the load receiving portions thereof normally at floor level, a plurality of plungers vertically movable below and secured at their tops to the under side of the frame, a piston below the floor level common to the plungers and means for effecting and controlling the movements of the piston, means comprising a cable connecting the lower end of each plunger to the piston and an adjustment for each cable whereby movements of the piston will effect equal movements of all of the plungers.

2. In an apparatus of the character described, a pair of rails channeled to receive the wheels of an automobile, cross members connected to said rails to form a rectangular frame, a plurality of vertically movable plungers below and supporting each of the rails, guides for each of the plungers, a sheave rotatably mounted in each of said guides and extending into a slot in the plunger, a cable running over each sheave and having one end connected to the lower end of the plunger, and means common to the plungers for simultaneneously operating all of the cables to raise and lower the aforesaid frame.

3. In an apparatus of the character described, a rectangular frame comprising a pair of channel tracks to receive the wheels of an automobile and normally at floor level and cross rails connecting the tracks, a plurality of vertically movable plungers beneath and supporting the frame, guide posts in which the plungers are slidably mounted, a sheave rotatably supported below the aforesaid frame by each guide post and having its periphery extending into a slot in the associated plunger, a cable attached to the lower end of each plunger and extending up to and over the associated sheave, and means common to the plungers and connected to give and permit equal and simultaneous movements of the cables and their connected plungers to raise and lower the aforesaid rectangular frame.

4. In an apparatus of the character described, the combination with a pair of parallel rails having their upper surfaces constructed to provide longitudinal channels to receive the wheels of an automobile, cross bars connecting the rails to form an open load support frame, a pit below the frame having its walls constructed to afford support for portions of the rails when they are in load receiving position, a vertically movable hollow plunger below and near each end of each rail, a sheave for each plunger supported for rotation in a vertical plane and having a portion of its periphery extending through a slot extending lengthwise of its plunger, a plurality of sheaves mounted for rotation in horizontal planes, a movable element in the aforesaid pit common to the plungers and means for eeffcting and controlling movements of said member, a cable attached at one end to the lower end of each plunger and running over a vertical and a horizontal sheave, and means comprising a turnbuckle for securing the other end of each cable to the commmon movable member.

5. In an apparatus of the character described, the combination of a pair of parallel rails normally at floor level and having their upper surfaces formed as longitudinal channels to receive the wheels of an automobile, cross bars connecting the rails, a plurality of hollow, vertically movable plungers attached to and below each of the rails, a sheave for each plunger rotatable in a vertical plane and having its periphery extending through a slot running lengthwise of the plunger, a sheave for each plunger rotatable in a horizontal plane, a piston common to the plungers, and means comprising a turnbuckle and a cable running around one of the horizontal sheaves over one of the vertical sheaves and down through the interior of its plunger for connecting each plunger to the piston.

In testimony whereof I hereto affix my signature.

JOHN JAMES McCONNELL.